US007261680B2

(12) United States Patent
Lutz

(10) Patent No.: US 7,261,680 B2
(45) Date of Patent: Aug. 28, 2007

(54) STRESS AND/OR TEMPERATURE-INDICATING COMPOSITION FOR ROLL COVERS

(75) Inventor: Andreas Lutz, Nideggen (DE)

(73) Assignee: Stowe Woodward, L.L.C., Middletown, VA (US)

( * ) Notice: Subject to any disclaimer, the term of this patent is extended or adjusted under 35 U.S.C. 154(b) by 200 days.

(21) Appl. No.: 10/417,622

(22) Filed: Apr. 17, 2003

(65) Prior Publication Data

US 2003/0224917 A1 Dec. 4, 2003

Related U.S. Application Data

(60) Provisional application No. 60/373,568, filed on Apr. 18, 2002.

(30) Foreign Application Priority Data

Mar. 20, 2003 (DE) ................................ 103 12 464

(51) Int. Cl.
*F16C 13/00* (2006.01)

(52) U.S. Cl. ............................ 492/58; 492/59; 492/56; 100/35

(58) Field of Classification Search .................. 492/58, 492/59, 56; 100/35
See application file for complete search history.

(56) References Cited

U.S. PATENT DOCUMENTS

| | | | | | |
|---|---|---|---|---|---|
| 3,686,731 | A | * | 8/1972 | Koori et al. | 492/56 |
| 4,250,605 | A | * | 2/1981 | Chapman | 492/56 |
| 4,666,949 | A | | 5/1987 | Shimizu et al. | 521/114 |
| 4,681,791 | A | | 7/1987 | Shibahashi et al. | 428/96 |
| 5,142,759 | A | * | 9/1992 | Bonander et al. | 492/48 |
| 5,194,183 | A | | 3/1993 | Munch et al. | 252/586 |
| 5,320,784 | A | | 6/1994 | Miyashita | 252/583 |
| 5,352,649 | A | | 10/1994 | Shibahashi et al. | 503/207 |
| 5,376,448 | A | * | 12/1994 | Suzuki et al. | 428/382 |
| 5,462,705 | A | | 10/1995 | Springsteen | 264/122 |
| 5,465,301 | A | | 11/1995 | Jotcham et al. | 380/54 |
| 5,606,983 | A | * | 3/1997 | Monty et al. | 132/229 |
| 5,688,592 | A | | 11/1997 | Shibahashi et al. | 428/323 |
| 5,690,857 | A | | 11/1997 | Osterried et al. | 252/299.1 |
| 5,699,729 | A | * | 12/1997 | Moschel | 100/99 |
| 5,723,178 | A | | 3/1998 | Sheets | 427/258 |
| 5,763,519 | A | | 6/1998 | Springsteen | 524/403 |
| 5,922,996 | A | | 7/1999 | Ryeczek | 174/112 |
| 5,997,849 | A | | 12/1999 | Small et al. | 424/61 |

(Continued)

FOREIGN PATENT DOCUMENTS

WO WO99/05935 * 2/1999

OTHER PUBLICATIONS

PCT Search Report PCT/US 03/11953.

*Primary Examiner*—David P. Bryant
*Assistant Examiner*—Afzali Sarang
(74) *Attorney, Agent, or Firm*—Myers Bigel Sibley & Sajovec

(57) ABSTRACT

An industrial roll includes: a substantially cylindrical core and a cover overlying the adhesive layer. The cover typically comprises a polymeric top stock layer which comprises a mixture of a polymeric material and at least one of a piezochromic material and a thermochromic material. In this configuration, the pressure and/or temperature experienced by the roll cover at any location thereon can be determined visually, without the need for external equipment.

19 Claims, 1 Drawing Sheet

U.S. PATENT DOCUMENTS 6,117,920 A 9/2000 Jolliffe et al. ............... 522/170
6,132,568 A 10/2000 Jin et al. ............... 204/192.26
6,139,779 A 10/2000 Small et al. ................ 252/583
6,145,512 A 11/2000 Daley ........................ 132/76.4
6,228,804 B1 5/2001 Nakashima ................. 503/226
6,244,171 B1 * 6/2001 Kayser ........................ 100/35
6,261,469 B1 7/2001 Zakhidov et al. ............. 216/56
6,287,246 B1 * 9/2001 Yoshii et al. ................. 492/59

* cited by examiner

STRESS AND/OR TEMPERATURE-INDICATING COMPOSITION FOR ROLL COVERS

RELATED APPLICATIONS

This application claims priority from U.S. Provisional Application Ser. No. 60/373,568, filed Apr. 18, 2002, and German Application No. 103 12 464.0, filed Mar. 20, 2003, the disclosures of each of which are hereby incorporated herein in their entireties.

FIELD OF THE INVENTION

The present invention relates generally to industrial rolls, and more particularly to covers for industrial rolls.

BACKGROUND OF THE INVENTION

Cylindrical rolls are utilized in a number of industrial applications, especially those relating to papermaking. Such rolls are typically employed in demanding environments in which they can be exposed to high dynamic loads and temperatures and aggressive or corrosive chemical agents. As an example, in a typical paper mill, rolls are used not only for transporting a fibrous web sheet between processing stations, but also, in the case of press section and calender rolls, for processing the web sheet itself into paper.

Typically rolls used in papermaking are constructed with the location within the papermaking machine in mind, as rolls residing in different positions within the papermaking machines are required to perform different functions. Because papermaking rolls can have many different performance demands, and because replacing an entire metallic roll can be quite expensive, many papermaking rolls include a polymeric cover that surrounds the circumferential surface of a typically metallic core. By varying the material employed in the cover, the cover designer can provide the roll with different performance characteristics as the papermaking application demands. Also, repairing, regrinding or replacing a cover over a metallic roll can be considerably less expensive than the replacement of an entire metallic roll. Exemplary polymeric materials for covers include natural rubber, synthetic rubbers such as neoprene, styrene-butadiene (SBR), nitrile rubber, chlorosulfonated polyethylene ("CSPE"—also known under the trade name HYPALON® from DuPont), EDPM (the name given to an ethylene-propylene terpolymer formed of ethylene-propylene diene monomer), polyurethane, thermoset composites, and thermoplastic composites.

In many instances, the roll cover will include at least two distinct layers: a base layer that overlies the core and provides a bond thereto; and a topstock layer that overlies and bonds to the base layer and serves the outer surface of the roll (some rolls will also include an intermediate "tie-in" layer sandwiched by the base and top stock layers). The layers for these materials are typically selected to provide the cover with a prescribed set of physical properties for operation. These can include the requisite strength, elastic modulus, and resistance to elevated temperature, water and harsh chemicals to withstand the papermaking environment. In addition, covers are typically designed to have a predetermined surface hardness that is appropriate for the process they are to perform, and they typically require that the paper sheet "release" from the cover without damage to the paper sheet. Also, in order to be economical, the cover should be abrasion- and wear-resistant.

Some rolls are present as "nip" rolls, wherein two or more rolls are positioned such that they form a "nip" through which a web can pass. Such rolls are often found, for example, in the press section of a papermaking machine. The rolls press against the web at a prescribed pressure in order to advance processing. However, in some instances the rolls can apply pressure unevenly on the web. Uneven pressure application can result from many circumstances, including (a) the cover of one or more rolls being slightly "out of round", (b) one roll being mounted so that its axis is not parallel to that of its mating roll, or (c) increased localized wear on one of the roll covers. Irrespective of the cause of the uneven pressure, its presence can negatively impact processing of the web, and can in extreme instances harm the cover or even cause it to fracture.

Further, the temperature of a roll can influence processing. Uneven or undesirable temperature distributions can be created in a roll by some of the same mechanisms described above for uneven pressure application.

Some systems for attempting to detect the pressure or temperature within a roll are available. One system includes a flexible strip on which are mounted multiple pressure sensors that can be placed between the rolls and provide pressure and/or temperature readings (see, e.g., U.S. Pat. No. 5,953,230 to Moore). Another system employs sensors that are embedded in the roll cover itself and provide signals to an external processor (see, e.g., U.S. Pat. No. 5,699,729 to Moschel et al.). However, each of these systems include electric or electronic communications equipment and data that may require processing, maintenance and the like and that may malfunction or interfere with operations. As such, it would be desirable to provide an alternative system for detecting pressure and/or temperature levels and distribution in rolls.

SUMMARY OF THE INVENTION

The present invention can provide rolls and polymeric roll covers therefore that are able indicate levels of pressure and/or temperature present in the cover without the need for additional or external devices. Such a roll includes a substantially cylindrical core and a cover overlying the core. The cover includes at least one layer (typically the top stock layer) that comprises a mixture of a polymeric material and at least one of a piezochromic material and a thermochromic material. In this configuration, the pressure and/or temperature experienced by the roll cover at any location thereon can be determined visually, without the need for external equipment.

An additional aspect of the invention lies in the use of an interfacially-active substance in combination with a colorant/developer system and a flux. The thermochromic component consists in the colorant/developer combination, including a suitable flux, the components in each case being combined specifically for a certain colour change at a certain temperature. In advantageous manner, the surface-active substance and/or the surface-active substance in combination with the flux enables a very large number of colorant/developer systems to be used, because, by means of the surface-active substance or a combination of the surface-active substance with the flux, the functional groups of the starting components for the production of the thermoset are shielded from the colorant/developer system. The surface-active components and fluxes can also be based on a high molecular weight structure. Accordingly it is possible to use almost any desired colorant/developer systems, the starting components for the production of the thermoset likewise not being subject to any limitation. Depending upon the system used, it is merely necessary for the surface-active substance in particular and, depending upon the colorant system, the flux to be matched to the particular requirements.

DETAILED DESCRIPTION OF THE INVENTION

Figure 1:
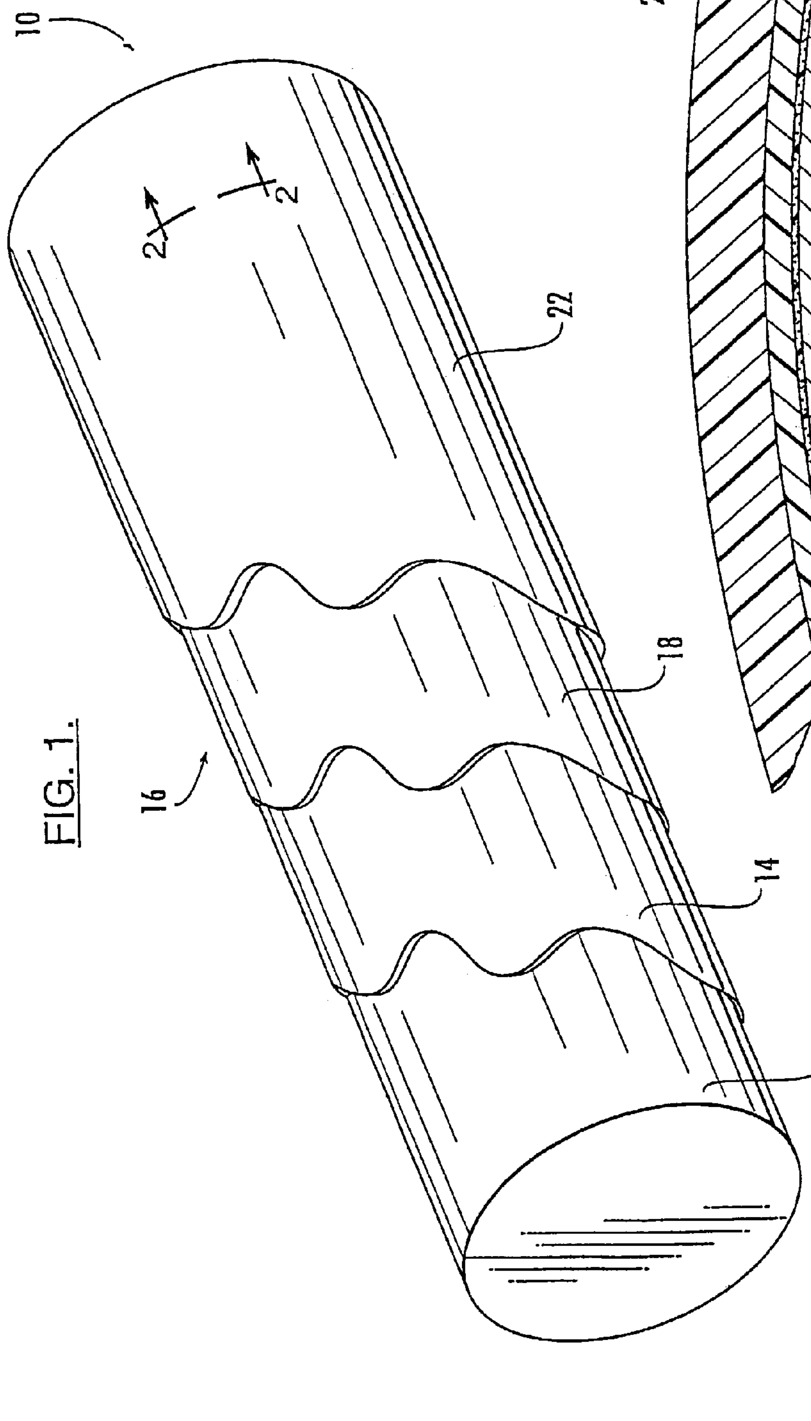
FIG. 1 is a cutaway perspective view of an industrial roll and roll cover of the present invention.

The present invention will now be described more fully hereinafter, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout, and thicknesses and dimensions of some components or features may be exaggerated for clarity. It will be understood that when an element or layer is referred to as being "connected" or "coupled" to or "overlying" another element or layer, it can be directly connected or coupled to the other element or layer or intervening elements or layers may be present. In contrast, when an element is referred to as being "directly connected" or "directly coupled" to or "directly overlying" another element or layer, there are no intervening elements or layers present.

Figure 2:
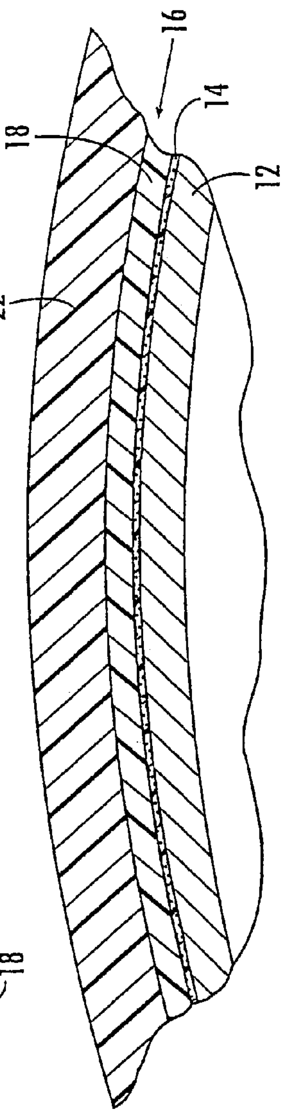
FIG. 2 is a section view taken through lines 2-2 of FIG. 1.

Referring now to the drawings, a papermaking roll, designated broadly at 10, is illustrated in FIGS. 1 and 2. The roll 10 includes in overlying relationship a core 12 (typically metallic), an adhesive layer 14, and a cover 16. Each of these components is discussed in greater detail hereinbelow.

The core 12 is a substantially cylindrical, hollow structure typically formed of steel, some other metal, or even a composite material. The core 12 is typically between about 1.5 and 400 inches in length and 1 and 70 inches in diameter, with lengths between about 100 and 400 inches and diameters of between about 20 and 70 inches being preferred. At these preferred length and diameter ranges, the core 12 typically has walls between about 1 and 5 inches in thickness. Components such as journals and bearings (not shown) are typically included on the core 12 to facilitate its mounting and rotation in a papermaking machine. The surface of the core 12 may be treated by blasting, sanding, sandblasting, or the like to prepare the surface for bonding to the adhesive layer 14.

Referring again to FIGS. 1 and 2, the adhesive layer 14 comprises an adhesive (typically an epoxy adhesive) that can attach the core 12 to the cover 16. Of course, the adhesive comprising the adhesive layer 14 should be chosen to be compatible with the materials of the core 12 and the base layer 18 of the cover 16 (i.e., it should provide a high-integrity bond between these structures without unduly harming either material); preferably, the bond has a tensile bond strength of between about 1,200 and 5,000 psi. The adhesive may have additives, such as curing agents, that facilitate curing and physical properties. Exemplary adhesives include Chemlok 220X and Chemlok 205, which are epoxy adhesives available from Lord Corporation, Raleigh, N.C.

The adhesive layer 14 can be applied to the core 12 in any manner known to be suitable to those skilled in this art for applying a thin layer of material. Exemplary application techniques include spraying, brushing, immersion, scraping, and the like. It is preferred that, if a solvent-based adhesive is used, the adhesive layer 14 be applied such that the solvent can evaporate prior to the application of the cover 16 in order to reduce the occurrence of trapped solvent that can cause "blows" during the curing process. Those skilled in this art will appreciate that the adhesive layer 14 may comprise multiple coats of adhesive, which may comprise different adhesives; for example, two different epoxy adhesives with slightly different properties may be employed. It should also be noted that, in some embodiments, the adhesive layer may be omitted entirely, such that the cover 16 is bonded directly to the core 12.

Still referring to FIGS. 1 and 2, the cover 16 comprises, in overlying relationship, a base layer 18 and a top stock layer 22. In the illustrated embodiment, the base layer 18 is adhered to the adhesive layer 14. The base layer 18 comprises a polymeric compound (preferably an elastomeric compound) that typically includes fillers and other additives. Exemplary elastomeric compounds include polyurethane, natural rubber and synthetic rubbers such as SBR, EPDM, CSPE, nitrile rubber, neoprene, isoprene, silicone, and fluoroelastomers, and blends and co-polymers thereof, including blends with polyvinylchloride (PVC). An exemplary polymeric material that may be suitable for use in the base layer is epoxy. Additional monomers and monomer coagents, such as trimethyl propane trimethacrylate and 1, 3 butylene glycol dimethacrylate, may also be added to the base layer 18 to enhance polymerization.

Fillers are typically added to the base layer 18 to modify the physical properties of the compound and/or to reduce its cost. Exemplary filler materials include inorganic oxides such as aluminum oxide ($Al_2O_3$), silicon dioxide ($SiO_2$), magnesium oxide (MgO), calcium oxide (CaO), zinc oxide (ZnO) and titanium dioxide ($TiO_2$), carbon black (also known as furnace black), silicates such as clays, talc, wollastonite ($CaSiO_3$), magnesium silicate ($MgSiO_3$), anhydrous aluminum silicate, and feldspar ($KAlSi_3O_8$), sulfates such as barium sulfate and calcium sulfate, metallic powders such as aluminum, iron, copper, stainless steel, or nickel, carbonates such as calcium carbonate ($CaCo_3$) and magnesium carbonate ($MgCo_3$), mica, silica (natural, fumed, hydrated, anhydrous or precipitated), and nitrides and carbides, such as silicon carbide (SiC) and aluminum nitride (AlN). These fillers may be present in virtually any form, such as powder, pellet, fiber or sphere.

Also, the base layer 18 may optionally include other additives, such as polymerization initiators, activators and accelerators, curing or vulcanizing agents, plasticizers, heat stabilizers, antioxidants and antiozonants, coupling agents, pigments, and the like, that can facilitate processing and enhance physical properties. These components are generally compounded into the polymer prior to the time of application of the base layer 18 to the adhesive layer 14 or directly to the core 12. Those skilled in this art will appreciate that the identity and amounts of these agents and their use in a base layer are generally known and need not be described in detail herein.

The base layer 18 can be applied by any manner known to those skilled in this art to be suitable for the application of polymers to an underlying surface. Preferably, the base layer 18 is applied through an extrusion process in which strips of the base layer 18 are extruded through an extrusion die, then, while still warm, are overlaid over the adhesive layer 14 as it is still somewhat tacky. The base layer strips are preferably between about 0.030 and 0.125 inches in thickness and are applied in an overlapping manner, with the result that total thickness of the base layer 18 is typically between about 0.0625 and 0.25 inches. Those skilled in this art will appreciate that, in some embodiments, the base layer 18 may be omitted such that the topstock layer 22 is adhered directly to the adhesive layer 14 or, in the absence of an adhesive layer, to the core 12.

In the illustrated embodiment, the topstock layer 22 overlies and, unless one or more tie-in layers are included as described below, is adhered to the base layer 18. The topstock layer 22 comprises a polymeric compound that typically includes fillers and other additives. Exemplary elastomeric compounds for the topstock layer 22 include polyurethane, natural rubber and synthetic rubbers such as SBR, EPDM, CSPE, nitrile rubber, neoprene, isoprene, silicone, and fluoroelastomers, and blends and co-polymers thereof, including blends with polyvinylchloride (PVC). Other exemplary polymeric compounds include epoxies.

As noted above, the topstock layer 22 includes thermochromic or piezochromic compositions within the polymeric formulation. As used herein, a "thermochromic composition" is a substance that changes color when subjected to different levels of temperature or heat, either reversibly or irreversibly. Exemplary thermochromic compositions include those that comprise an electron-donating component, an acidic material and an organic medium or solvent (see, e.g., U.S. Pat. Nos. 4,666,949 to Shimizu et al., 5,688,592 to Shibahashi et al.), those including an electron-donative color former, an electron-accepting developer and a color change temperature controlling agent (see, e.g., U.S. Pat. No. 4,681,791 to Shibahashi et al.), and liquid crystals such as chiral nematic cholesteric, biphenyl and related liquid crystals (see, e.g., U.S. Pat. Nos. 5,194,183 to Münch et al. and 5,690,857 to Osterried et al.).

The thermochromic composite can be been rendered substantially inert in the mixture with respect to the starting components for the production of the thermoset. Such inertization can be effected, depending upon the colour intensity of the colorant in question, by micro-encapsulation, while accepting the associated disadvantages, such as, for example, opacification of the capsule. According to the invention, however, it is preferred that the inertization of the thermochromic composite be achieved by surrounding the composite or, especially, the colorant with a protective shield which consists of a surface-active substance and/or a polymer and/or a mixture of surface-active substance and polymer. The protective shield is preferably in the form of a micelle. It should be emphasized here that the polymer and the surface-active substance, especially a surfactant, need not necessarily be in the form of a mixture in the physical sense, but may also be chemically combined with one another.

In accordance with a preferred embodiment of the invention, the inteffacially-active substance is present in the total system in a concentration which in a polar solvent has in advantageous manner reached or exceeded the critical micelle concentration CMC. Water is preferably used as reference solvent, but there are no restrictions at all in this respect, it being possible for the solvent system used to be matched at any time as desired to the components of the thermochromic composite and to the starting components for the production of the thermoset. The same is true of the pH value to be used and the reaction temperature, which, matched to the substance system in question, are each so chosen that micelle formation can take place. Inside the micelles, according to the invention in advantageous manner at least the colorantldeveloper system is shielded from the reactive groups of the starting components for the production of the thermoset, so that destruction or denaturing of the colour-imparting substances is avoided.

The flux serves on the one hand for better miscibility of the thermochromic composite with the starting components for the production of the thermoset and in turn for shielding the colorantldeveloper system from the resin-forming components. Furthermore, controlled by the temperature, the flux initiates the alteration in the state of aggregation of the complex. The structure of the flux ensures a well-adjusted hydrophobicity/hydrophilicity balance. For this purpose, the functional groups are arranged closely adjacent to a terminal hydrophobic structural component. Polymer components here include in a broad sense pre-condensates or monomers. All the starting components for the production of the thermosets may have more than one active functional group. According to the invention, the components of the composition are selected from one or more of the substances mentioned in Table 1 below:

TABLE 1

| | |
|---|---|
| Colorant | phthalides, fluorones, spiropyrans |
| Developer | phenols, organic acids and derivatives thereof |
| Flux | paraffins, saturated and unsaturated alcohols, acids, esters, amides, amines |
| Surface-active substance | ionic and non-ionic surfactants, dioctyl sulfosuccinate, C-12 sulfobetaine, C-16 amine oxide, Na dodecyl sulfate, cetyltrimethylammonium bromide |
| Starting components for the production of the thermoset | polyesters, formaldehyde resins, epoxy resins, polyurethanes, hydroxycarboxylic acids, dialcohols, diepoxides, diisocyanates, diamines, vinyl monomers, diene adducts of maleic acid, phthalic acid derivatives |
| Polymer | PVA, polyacrylic acid, polyether, polyester, styrene, polyacrylamide, polyethylene, polypropylene, maleic anhydride copolymers, melamine |

The concentrations of the components of the composition that are preferred according to the invention can be found in Table 2 below:

TABLE 2

| Component | % by weight | preferred % by weight | especially preferred % by weight |
|---|---|---|---|
| Colorant | 0.005–0.8 | 0.01–0.5 | 0.1–0.25 |
| Developer | 0.005–1.6 | 0.01–1.0 | 0.1–0.5 |
| Flux | 0.5–6.5 | 0.1–6.0 | 1.0–3.0 |
| Surface-active substance | 0.008–2.3 | 0.01–2.0 | 0.2–0.6 |
| Starting components for the production of the thermoset | 87.5–99.9 | 90.0–99.5 | 95.0–98.5 |
| Polymer | 0.05–7.3 | 0.11–6.1 | 0.5–3.0 |

As used herein, a "piezochromic composition" is a substance that changes color when subjected to different levels of pressure, either reversibly or irreversibly. Exemplary piezochromic compositions include: 9-(p-nitrophenylphenylmethylene)xanthene, diflavine, dehydrodianthrone, hexaphenylbiimidazolyl, tetraphenylvinyl dimer, phthalocyanine-cobalt complex and hydroxycarboxylic acid derivatives, spiropyranthiopyrans and spirobenzopyranoxadiazoline derivatives, both of which are commonly referred to briefly as spiropyrans (see U.S. Pat. No. 5,320,784 to Miyashita), samarium sulfides (such as samarium monosulfide and disamarium trisulfide) (see U.S. Pat. No. 6,132,568 to Jin et al.), and three-dimensionally periodic materials (such as those disclosed in U.S. Pat. No. 6,261,469 to Zakhidov et al.). Piezochromic materials are preferably included in an amount of between about 0.001 and 10 parts (more preferably between about 0.01 and 5 parts) by weight to 100 parts polymer of the topstock layer 22, and preferably provide an identifiable color change at a pressure of between about 1,450 and 15,000 psi (more preferably between about 2,000 and 10,000 psi). Thermochromic materials are preferably included in an amount of between about 0.001 and 10 parts (more preferably between about 0.01 and 5 parts) by weight to 100 parts polymer of the topstock layer 22, and preferably provide an identifiable color change at a temperature of between about 40 and 180 degrees C. (more preferably between about 70 and 160 degrees C.). A topstock layer 22 may include both piezochromic and thermochromic materials, but these should be selected so that their color change characteristics are compatible with one another. Exemplary compositions are described in German Application No. 103 12 464.0, filed Mar. 20, 2003, the disclosures of which is hereby incorporated herein in its entirety.

Preferably, the piezochromic and/or thermochromic materials are microencapsulated prior to inclusion in the topstock layer 22. It is also preferred that these materials be generally homogenously distributed on the surface of the topstock layer 22, if not throughout the topstock layer 22, in order to provide a more accurate indication of the pressure and/or temperature being experienced by the cover 16.

The topstock layer 22 typically also includes fillers that are added to modify and enhance the physical and processing properties and/or to reduce the cost of the topstock layer 22. Exemplary fillers include silicone dioxide, carbon black, clay, and titanium dioxide ($TiO_2$) as well as others set forth hereinabove in connection with the base layer 18. Typically, fillers are included in an amount of between about 3 and 70 percent by weight of the topstock layer 22. The fillers can take virtually any form, including powder, pellet, bead, fiber, sphere, or the like.

The topstock layer 22 also typically includes other additives, such as polymerization initiators, activators and accelerators, curing or vulcanizing agents, plasticizers, heat stabilizers, antioxidants, coupling agents, pigments, and the like, that can facilitate processing and enhance physical properties. Those skilled in this art will understand the types and concentrations of additives that are appropriate for inclusion in the topstock layer 22, so these need not be discussed in detail herein.

The top stock layer 22 can be applied over the base layer 18 by any technique known to those skilled in this art to be suitable for the application of elastomeric materials over a cylindrical surface. Preferably, the components of the topstock layer 22 are mixed separately, then blended in a mill. The blended material is transferred from the mill to an extruder, which extrudes feed strips of top stock material onto the base layer 18. Preferably, the top stock layer 22 is applied such that it is between about 1 and 2.5 inches in thickness (at higher thickness, multiple passes of material may be required). It is also preferred that the thickness of the top stock layer 22 be between about 50 and 75 percent of the total cover thickness (i.e., the total thickness of the combined base and top stock layers 18, 22). Alternatively, either or both of the base and top stock layers 18, 22 can be applied through the overlaying of calendered sheets of material.

The elastomeric compounds of the base layer 18 and the top stock 22 may be selected such that the base layer 18 has a higher hardness value than the top stock layer 22. As an example, the base layer 18 may have a hardness of between about 5 and 15 P&J, and the top stock layer 22 may have a hardness of between about 170 and 230 P&J. The graduated modulus concept can reduce the bond line shear stresses that can occur due to mismatches of the elastic properties (such as elastic modulus and Poisson's ratio) of the various layers in the cover constructions. This reduction in interface shear stress can be important in maintaining cover integrity.

Those skilled in this art will also appreciate that the roll 10 may be constructed with a tie-in layer sandwiched between the base layer 18 and the top stock layer 22, such that the tie-in layer would directly underlie the top stock layer 22. The typical properties of a tie-in layer are well-known to those skilled in this art and need not be described in detail herein.

After the top stock 22 has been applied, the roll 10 is then cured, typically in an autoclave, for a suitable curing period (generally between about 16 and 30 hours). After curing, it is preferred that any crust that has developed is skimmed from the surface of the top stock layer 22, and that the top stock layer 22 is ground for dimensional correctness.

Roll covers formed of the compositions described above can be employed in nip rolls or other roll positions within papermaking machines or other devices. In position, and during operation of the machine, the roll cover, due to the presence of a thermochromic and/or piezochromic composition therein, can provide information about the temperature and/or pressure experienced by the roll cover. As such, undesirable circumstances, such as uneven application of pressure, misalignment or miscrowning of nip rolls, improper roll profile, overloading of the roll beyond a preselected limit, the presence of "hot spots" in the cover, localized wear, or the like, can be discerned visually during operation. Also, photographs can be taken of the cover and compared to other photographs taken later in time to determine whether processing conditions have changed. Any of these techniques may be preferable to the use of external devices, particularly in locations of a machine that are difficult to access.

It should also be noted that, in some embodiments, the cover may include a tie-in or other intermediate layer that comprises a thermochromic or piezochromic material, and the top stock layer is transparent to permit the visual examination of the intermediate layer.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. An industrial roll, comprising:

a substantially cylindrical core; and a cover overlying said core, said cover comprising a layer overlying said core comprising a mixture of a polymeric material and a piezochromic material, wherein the mixture further comprises 100 parts polymeric material by weight and between about 0.001 and 10 parts thermocbromic material by weight.

2. The roll defined in claim 1, wherein the cover comprises a top stock layer, and wherein the top stock layer is the layer comprising the mixture of a polymeric material and a piezochromic material and a thermochromic material.

3. The roll defined in claim 2, wherein the cover further comprises a base layer, the base layer overlying the core and underlying the top stock layer.

4. The roll defined in claim 3, wherein the cover further comprises a tie-in layer between the base layer and the top stock layer.

5. The roll defined in claim 1, wherein the thermochromic material is selected and included in an amount such that it displays an identifiable color change at a temperature of between about 40 and 180 degrees C.

6. The roll defined in claim 1, wherein the mixture comprises 100 parts polymeric material by weight and between about 0.001 and 10 parts piezochromic material by weight.

7. The roll defined in claim 1, wherein the polymeric material comprises a rubber material.

8. The roll defined in claim 1, wherein the piezochromic material is selected and included in an amount such that it displays an identifiable color change at a pressure of between about 1450 and 15,000 psi.

9. The roll defined in claim 1, further comprising an adhesive layer between the core and the cover.

10. The roll defined in claim 1, wherein the layer comprising the mixture is an intermediate layer overlying the core, and wherein the cover comprises a transparent top stock layer that overlies the intermediate layer.

11. An industrial roll, comprising:

a substantially cylindrical core; and a cover overlying said core, said cover comprising a layer overlying said core comprising a mixture of a polymeric material and a thermochromic material, and further comprising a dye-developer, a fluxing agent, and an interfacially-active substance.

12. The roll defined in claim 11, wherein the cover comprises a top stock layer, and wherein the top stock layer is the layer comprising the mixture of a polymeric material and a thermochromic material.

13. The roll defined in claim 12, wherein the cover further comprises a base layer, the base layer overlying the core and underlying the top stock layer.

14. The roll defined in claim 13, wherein the cover further comprises a tie-in layer between the base layer and the top stock layer.

15. The roll defined in claim 11, wherein the mixture comprises 100 parts polymeric material by weight and between about 0.001 and 10 parts thermochromic material by weight.

16. The roll defined in claim 11, wherein the polymeric material comprises a rubber material.

17. The roll defined in claim 11, wherein the thermochromic material is selected and included in an amount such that it displays an identifiable color change at a temperature of between about 40 and 180 degrees C.

18. The roll defined in claim 11, further comprising an adhesive layer between the core and the cover.

19. The roll defined in claim 11, wherein the layer comprising the mixture is an intermediate layer overlying the core, and wherein the cover comprises a transparent top stock layer that overlies the intermediate layer.

* * * * *